(12) United States Patent
Hong et al.

(10) Patent No.: US 10,883,049 B2
(45) Date of Patent: Jan. 5, 2021

(54) LIQUID CRYSTAL DISPLAY PANEL

(71) Applicant: SAMSUNG DISPLAY CO., LTD., Yongin-si (KR)

(72) Inventors: Sung Hwan Hong, Suwon-si (KR); Mi Suk Kim, Suwon-si (KR); Tae Ho Kim, Asan-si (KR); Keun Chan Oh, Cheonan-si (KR); Chang Hun Lee, Hwaseong-si (KR)

(73) Assignee: SAMSUNG DISPLAY CO., LTD., Yongin (KR)

( * ) Notice: Subject to any disclaimer, the term of this patent is extended or adjusted under 35 U.S.C. 154(b) by 36 days.

(21) Appl. No.: 15/689,734

(22) Filed: Aug. 29, 2017

(65) Prior Publication Data
US 2018/0066190 A1 Mar. 8, 2018

Related U.S. Application Data

(62) Division of application No. 14/656,184, filed on Mar. 12, 2015, now abandoned.

(30) Foreign Application Priority Data

Oct. 10, 2014 (KR) .................. 10-2014-0136911

(51) Int. Cl.
| | | |
|---|---|---|
| *G02F 1/1333* | (2006.01) | |
| *C09K 19/54* | (2006.01) | |
| *C09K 19/30* | (2006.01) | |
| *C09K 19/38* | (2006.01) | |
| *G02F 1/137* | (2006.01) | |
| *C09K 19/12* | (2006.01) | |

(52) U.S. Cl.
CPC .......... *C09K 19/54* (2013.01); *C09K 19/3066* (2013.01); *C09K 19/3823* (2013.01); *C09K 2019/122* (2013.01); *C09K 2019/301* (2013.01); *C09K 2019/3009* (2013.01); *C09K 2019/3027* (2013.01); *G02F 2001/13712* (2013.01)

(58) Field of Classification Search
CPC ............... C09K 19/54; C09K 19/3006; C09K 19/3823; C09K 2019/122; C09K 2019/3009; C09K 2019/301; C09K 2019/3027; G02F 1/1333; G02F 2001/13712
USPC .................................................... 252/299.01
See application file for complete search history.

(56) References Cited

U.S. PATENT DOCUMENTS

| | | | |
|---|---|---|---|
| 7,976,910 B2 * | 7/2011 | Cho .................. | C09K 19/3001 252/299.63 |
| 8,692,970 B2 | 4/2014 | Uchino et al. | |
| 9,371,482 B2 | 6/2016 | Kim et al. | |
| 9,873,834 B2 | 1/2018 | Goebel et al. | |
| (Continued) | | | |

FOREIGN PATENT DOCUMENTS

| | | |
|---|---|---|
| JP | 2011-107266 | 6/2011 |
| KR | 1020130066816 | 6/2013 |
| KR | 10-2014-0032964 | 3/2014 |

*Primary Examiner* — Geraldina Visconti
(74) *Attorney, Agent, or Firm* — F. Chau & Associates, LLC

(57) ABSTRACT

A liquid crystal display (LCD) panel includes a first substrate, a second substrate, and a liquid crystal layer disposed between the first substrate and the second substrate. The liquid crystal layer includes liquid crystals with negative dielectric anisotropy and a hindered amine light stabilizer (HALS).

3 Claims, 5 Drawing Sheets

(56) References Cited

U.S. PATENT DOCUMENTS

| | | |
|---|---|---|
| 10,268,081 B2 | 4/2019 | Uchino et al. |
| 10,634,954 B2 | 4/2020 | Uchino et al. |
| 2005/0237465 A1 | 10/2005 | Lu et al. |
| 2008/0158491 A1 | 7/2008 | Zhu et al. |
| 2011/0115999 A1 | 5/2011 | Uchino et al. |
| 2013/0244177 A1 | 9/2013 | Tseng et al. |
| 2013/0258268 A1* | 10/2013 | Goebel .................. C09K 19/44 349/186 |
| 2014/0110630 A1* | 4/2014 | Goebel .................. C09K 19/12 252/299.5 |
| 2014/0220848 A1 | 8/2014 | Uchino et al. |
| 2016/0103342 A1 | 4/2016 | Hong et al. |
| 2016/0140890 A1 | 5/2016 | Kim et al. |
| 2018/0066190 A1* | 3/2018 | Hong ..................... C09K 19/54 |
| 2019/0179203 A1 | 6/2019 | Uchino et al. |
| 2020/0225543 A1 | 7/2020 | Uchino et al. |

\* cited by examiner

LIQUID CRYSTAL DISPLAY PANEL

CROSS-REFERENCE TO RELATED APPLICATION

This application is a divisional application of U.S. patent application Ser. No. 14/656,184, filed on Mar. 12, 2015, which claims priority under 35 U.S.C. § 119 to Korean Patent Application No. 10-2014-0136911 filed on Oct. 10, 2014 in the Korean Intellectual Property Office, the disclosure of which is incorporated by reference herein in its entirety.

1. TECHNICAL FIELD

Exemplary embodiments of the present invention relate to a display panel, and more particularly to a liquid crystal display (LCD) panel.

2. DISCUSSION OF RELATED ART

Generally, a liquid crystal display (LCD) device includes an LCD panel, which has a first display panel having thin-film transistors (TFTs) formed thereon, a second display panel facing the first display panel, and a liquid crystal layer disposed between the first display panel and the second display panel.

A light source may be disposed at the rear of the LCD panel to supply light to the LCD panel. The amount of light emitted from the light source to the LCD panel may vary, for example, depending on the alignment of liquid crystals in the liquid crystal layer.

In the LCD device, if a still image is displayed for a long time, the still image may persist even after being replaced with another image and this effect may lower the quality of display. This phenomenon may be referred to as a residual image or image sticking.

Residual image or image sticking may occur due to a residual direct current (DC) voltage generated in the liquid crystal layer and the susceptibility of an alignment layer, which may be in contact with the liquid crystal layer, to electrical stress.

Liquid crystals may deteriorate due to a DC voltage, and may have dielectric anisotropy (e.g., may have a variable dielectric constant depending on the direction of alignment thereof). Accordingly, liquid crystals are generally driven with an alternating current (AC) voltage.

An image signal voltage input to the source electrode of a TFT may begin to accumulate in the liquid crystal layer and a storage capacitor in response to the application of a gate pulse voltage. The accumulated voltage is supposed to be maintained until a subsequent frame, but may actually be discharged to some extent due to a parasitic capacitor Cgs formed by overlapping gate and source electrodes of the TFT.

Due to the discharged voltage (e.g., a kickback voltage or a level shift voltage), a DC voltage may be offset, and may thus be applied to the liquid crystal layer. In response to the DC voltage being applied to the liquid crystal layer, impurities in the liquid crystal layer may be ionized. As a result, positive ion impurities may be deposited on an alignment layer with negative polarity, and negative ion impurities may be deposited on an alignment layer with positive polarity.

The liquid crystal layer may retain the DC voltage therein due to the ions attached onto each of the alignment layers, and this retained DC voltage may be referred to as a residual DC voltage.

A residual DC Voltage may change the pretilt angle of liquid crystals in the liquid crystal layer, and as a result, the direction of alignment of the liquid crystals may be changed. Accordingly, the liquid crystals might not be able to properly respond to an external signal, thereby causing a residual image.

SUMMARY

Exemplary embodiments of the present invention provide a liquid crystal display (LCD) panel, which can reduce or eliminate image sticking, reduce or eliminate flicker during a low-frequency driving mode, consumes a relatively low amount of power consumption, and can increase transmission ratio and contrast.

However, exemplary embodiments of the present invention are not restricted to those set forth herein. The above and other exemplary embodiments of the present invention will become more apparent to one of ordinary skill in the art to which the invention pertains by describing in detail exemplary embodiments thereof.

The LCD panel according to an exemplary embodiment of the invention includes a first substrate; a second substrate, and a liquid crystal layer disposed between the first substrate and the second substrate. The liquid crystal layer includes liquid crystals with negative dielectric anisotropy and a hindered amine light stabilizer (HALS).

The HALS may include at least one unit compound of Formula (1):

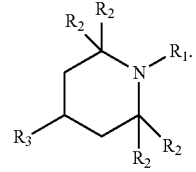

Formula (1)

The $R_1$ may be hydrogen (H), $C_1$-$C_{18}$ alkyl, cyclohexyl acrylate, methacrylate or $C_7$-$C_{18}$ alkyl aryl.

The $R_2$ may be H, $C_1$-$C_{18}$ alkyl, cyclohexyl acrylate, methacrylate or a $C_4$-$C_8$ cycloalkyl residue by two $R_2$s bonded to the same carbon atom.

The $R_3$ may be a hydroxyl group (—OH), a $C_1$-$C_{18}$ alkoxy group, a $C_4$-$C_8$ cycloalkoxy group, an alkoxy group of an aromatic cyclic compound or an alkoxy group of a heteroaromatic compound.

The HALS may range from 50 ppm to 1000 ppm of the total weight of the liquid crystal layer.

The HALS may range from 100 ppm to 1000 ppm of the total weight of the liquid crystal layer.

The LCD may include a first alignment layer disposed between the liquid crystal layer and the first substrate. A second alignment layer may be disposed between the liquid crystal layer and the second substrate. At least one of the first alignment layer and the second alignment layer may include a photo-polymerization-type polymer, a photo-isomerization-type polymer or a photo-decomposition-type polymer.

The photo-polymerization-type polymer may be a cinnamate-based polymer that aligns liquid crystals through a photo-polymerization reaction.

The photo-isomerization-type polymer may be a polymer with an azobenzene group that aligns liquid crystals through a photo-isomerization reaction.

The photo-decomposition-type polymer may be a cyclobutane-based polyimide polymer that aligns liquid crystals through a photo-decomposition reaction.

The cyclobutane-based polyimide polymer may include a monomer of Formula (2):

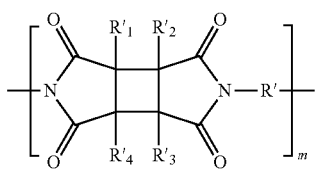

Formula (2)

Each of $R'_1$ to $R'_4$ may independently be H or a linear or branched, saturated or unsaturated alkyl group containing 1 to 20 carbon atoms.

The R' may be at least one diether compound selected from the group consisting of dimethoxyethane, ethoxymethoxy ethane, diethoxymethane and diethoxyethane, at least one aromatic compound selected from the group consisting of benzene, benzyl ether, phenylbenzene and diphenylbenzene, or a combination thereof.

The m may be a natural number ranging from 1 to 300.

The LCD panel may include a thin-film transistor (TFT), a common electrode and a pixel electrode disposed on the first substrate. An insulating layer may be disposed between the common electrode and the pixel electrode.

The LCD panel may include one or more color filters disposed on the second substrate. The one or more color filters may be disposed between the first substrate and the second substrate.

The liquid crystal layer may include neutral liquid crystals.

The liquid crystals with negative dielectric anisotropy may include polarized liquid crystals containing an alkoxy group. The content of the alkoxy group may range from 50% to 60% of the total weight of the neutral liquid crystals and the liquid crystals with negative dielectric anisotropy.

The polarized liquid crystals may include at least one of compounds of Formulas (3), (4) and (5):

Formula (3)

Formula (4)

Formula (5)

The X may be an alkyl group with two to five carbon atoms.

The Y may be an alkyl, alkenyl or alkoxy group with two to five carbon atoms.

The polarized liquid crystals may include a mixture of the compounds of Formulas (4) and (5).

The polarized liquid crystals might not include dialkoxy benzene compounds of formulas (6) and (7):

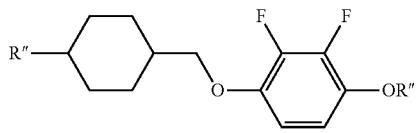

Formula (6)

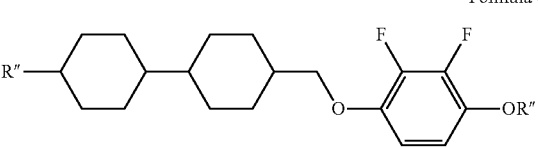

Formula (7)

The R" may be an alkyl, alkenyl or alkoxy group with two to five carbon atoms.

The liquid crystal display (LCD) panel according to an exemplary embodiment of the invention includes a first substrate, a second substrate, and a liquid crystal layer disposed between the first substrate and the second substrate. The liquid crystal layer includes neutral liquid crystals and polarized liquid crystals containing an alkoxy group. The alkoxy group ranges from 50% to 60% of the total weight of the neutral liquid crystals and the polarized liquid crystals.

The polarized liquid crystals may include at least one of the compounds of the Formulas (3), (4) and (5).

The polarized liquid crystals may include a mixture of the compounds of the Formulas (4) and (5).

The polarized liquid crystals might not include dialkoxy benzene compounds of the formulas (6) and (7).

According to exemplary embodiments of the present inventive concept, since liquid crystals with negative dielectric anisotropy are used, it may be possible to realize low power consumption while minimizing flicker as compared to the case of using liquid crystals with positive dielectric anisotropy.

It may be possible to increase voltage holding ratio (VHR) and ion density by adding a HALS to a liquid crystal layer including liquid crystals with negative dielectric anisotropy.

It may be possible to increase transmissivity and contrast by using a liquid crystal layer including liquid crystals with negative dielectric anisotropy and an optical alignment layer that is fabricated by an optical alignment method.

Since the liquid crystal layer containing liquid crystals with negative dielectric anisotropy and the HALS and an optical alignment layer may be used, it may be possible to reduce linear image sticking and surface image sticking that may be caused by using liquid crystals with negative dielectric anisotropy and surface image sticking that may be caused by using an optical alignment layer.

It may be possible to reduce image sticking by adjusting the content of an alkoxy group contained in the polarized liquid crystals to be in the range of 50% to 60% of the total weight of all liquid crystals in a liquid crystal layer.

Other features and exemplary embodiments will be apparent from the following detailed description, the drawings, and the claims.

BRIEF DESCRIPTION OF THE DRAWINGS

The above and other aspects and features of the present invention will become more apparent by describing in detail exemplary embodiments thereof with reference to the accompanying drawings, in which.

DETAILED DESCRIPTION OF THE EMBODIMENTS

Figure 1:
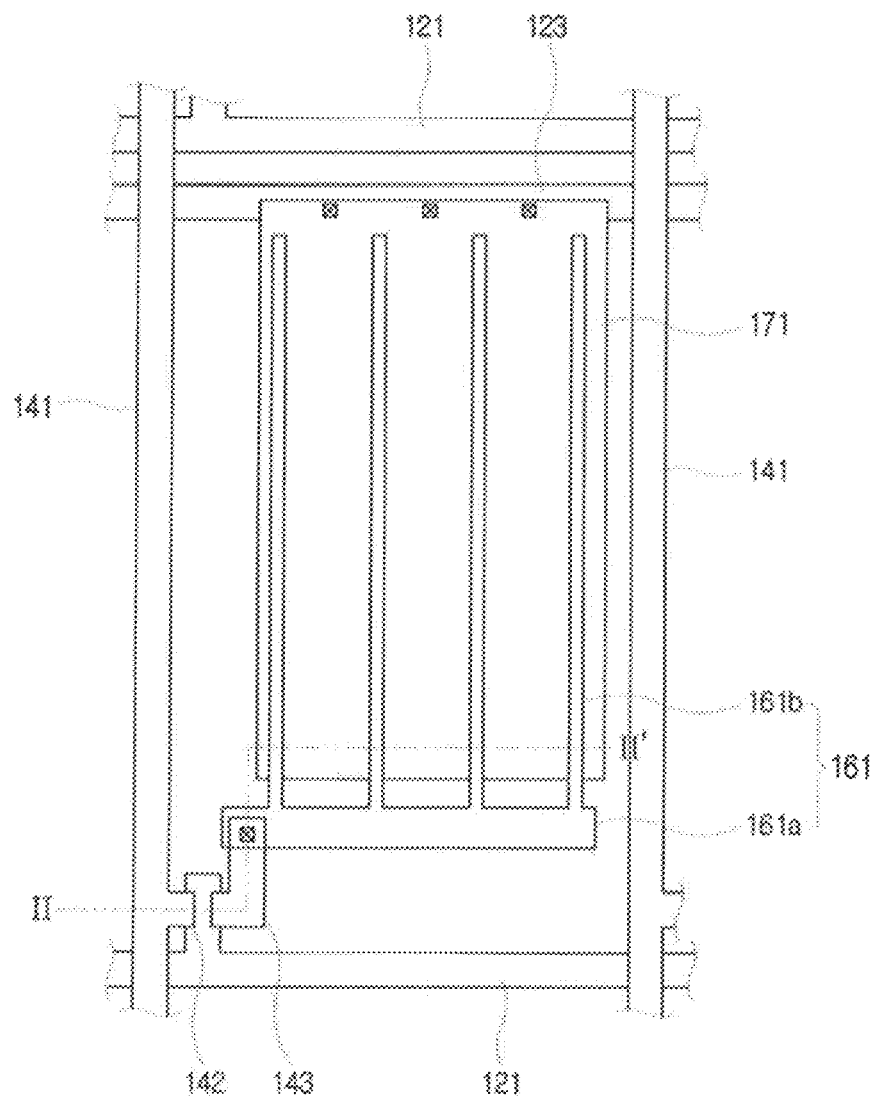
FIG. 1 is a layout diagram illustrating a liquid crystal display (LCD) panel according to an exemplary embodiment of the present invention.

The present invention and methods of accomplishing the same may be better understood by reference to the following detailed description of exemplary embodiments and the present invention. The present invention may, however, be embodied in many different forms and should not be construed as being limited to the embodiments set forth herein.

In the drawings, the thickness of layers and regions may be exaggerated for clarity. It will be understood that when an element or layer is referred to as being "on," "connected to" or "coupled to" another element or layer, the element or layer can be directly on, connected or coupled to another element or layer, or one or more intervening elements or layers may be present.

Like reference numbers may refer to like elements throughout the specification and drawings.

It will be understood that, although the terms first, second, third, etc., may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the invention.

Hereinafter, exemplary embodiments of the present invention will be described in more detail with reference to the accompanying drawings.

Examples of a liquid crystal display (LCD) panel according to an exemplary embodiment of the present invention may include twist nematic (TN), vertical alignment (VA), in plane switching (IPS) and plane-to-line switching (PLS)-mode LCD panels.

An LCD panel according to an exemplary embodiment of the present invention will be described in more detail below.

Figure 2:
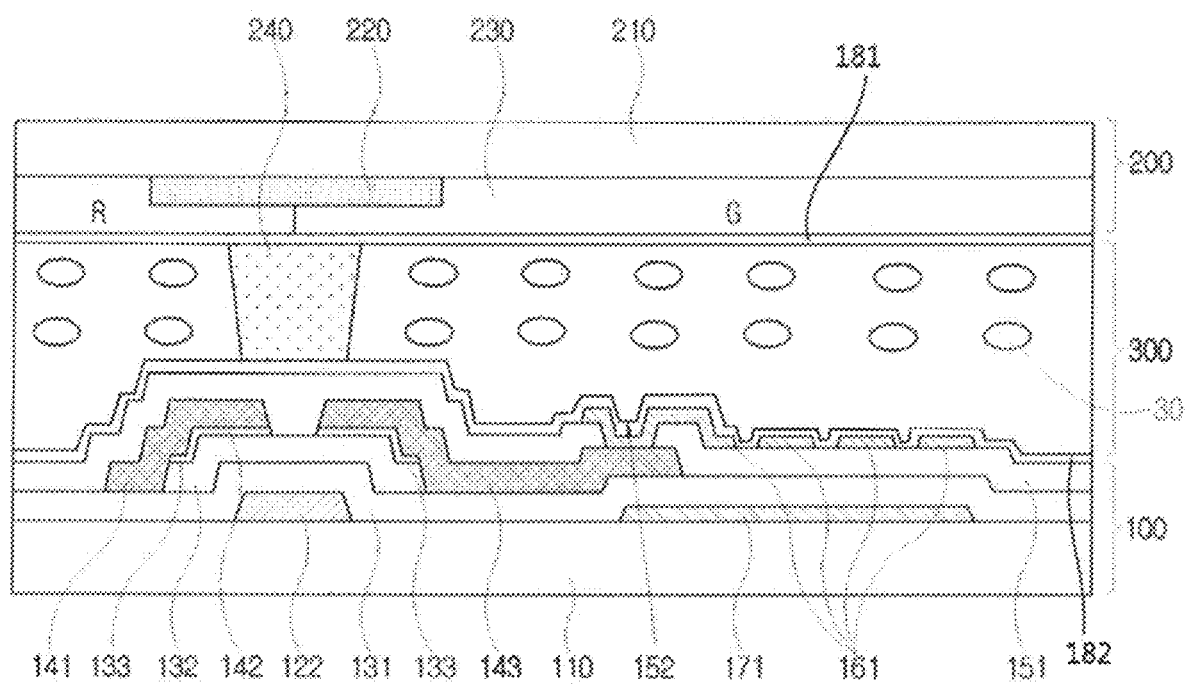
FIG. 2 is a cross-sectional view taken along line II-II' of FIG. 1 according to an exemplary embodiment of the present invention.

FIG. 1 is a layout diagram illustrating an LCD panel according to an exemplary embodiment of the present invention, and FIG. 2 is a cross-sectional view taken along line II-II' of FIG. 1 according to an exemplary embodiment of the present invention.

FIGS. 1 and 2 illustrate a layout and a cross-sectional view, respectively, of an LCD panel in which a common electrode and a pixel electrode are disposed in each pixel region with an insulating layer disposed therebetween. A vertical or horizontal electric field may be formed by forming a fringe electric field so as to allow the liquid crystals between upper and lower substrates to be driven in each pixel region.

Referring to FIGS. 1 and 2, the LCD panel according to an exemplary embodiment of the present invention may include a first display panel 100 on which a thin-film transistor (TFT) array is disposed, a second display panel 200, which may face, and may be bonded to the first display panel 100, and a liquid crystal layer 300, which may be disposed between the first display panel 100 and the second display panel 200.

The liquid crystal layer 300 may include liquid crystals 30 and a hindered amine light stabilizer (HALS).

The liquid crystals 30 may include neutral liquid crystals and/or liquid crystals with negative dielectric anisotropy. The neutral liquid crystals and the liquid crystals with negative dielectric anisotropy may be mixed in the ratio of 35:75 to 45:65 by weight.

The liquid crystals 30 may be horizontally aligned by a horizontal electric field generated between a common electrode 171 and a pixel electrode 161.

The HALS may suppress the formation of ions and/or radicals in the liquid crystal layer 300 by ultraviolet (UV) light and/or heat, and may suppress the formation of ions and/or radicals on the surface of alignment layers 181 and/or 182 by neutralizing acidic materials such as carboxyl acid (COOH) on the surface of the alignment layers 181 and/or 182 with its weak base (e.g., amine).

In a non-limiting example, the HALS may contain one or more unit compounds of Formula (1):

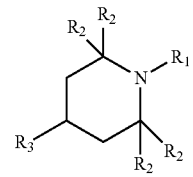

where $R_1$ may be hydrogen (H), $C_1$-$C_{18}$ alkyl, cyclohexyl acrylate, methacrylate or $C_1$-$C_{18}$ alkyl aryl, $R_2$ may be H, $C_1$-$C_{18}$ alkyl, cyclohexyl acrylate, methacrylate or a $C_4$-$C_8$ cycloalkyl residue including two $R_2$s bonded to the same carbon atom, and $R_3$ may be a hydroxyl group (—OH), a $C_1$-$C_{18}$ alkoxy group, a $C_4$-$C_8$ cycloalkoxy group, an alkoxy group of an aromatic cyclic compound or an alkoxy group of a heteroaromatic compound.

The HALS may range from 50 ppm to 1000 ppm of the total weight of the liquid crystal layer 300. The HALS may suppress the formation of ions and radicals and may capture positive ions in the above HALS's range. If the content of the HALS exceeds 1000 ppm, the HALS may serve as impurities.

In an exemplary embodiment of the present invention, the HALS may range from 100 ppm to 1000 ppm of the total weight of the liquid crystal layer 300. The HALS may suppress the disintegration of impurities in the liquid crystal layer 300 and may reduce the amount of negative and positive ion impurities generated.

The first display panel 100 may have a structure in which a gate electrode 122, the common electrode 171, a gate insulating layer 131, a semiconductor layer 132, a resistive contact layer 133 doped with impurities, a source electrode 142, a drain electrode 143, a protective layer 151, the pixel electrode 161 and the second alignment layer 182 are sequentially disposed on a first transparent substrate 110.

Gate wiring 121, 122 and 123 and the common electrode 171 may be disposed on the first transparent substrate 110. The gate wiring 121, 122 and 123 may be formed as a single layer by using a metal such as chromium (Cr), a Cr alloy, an aluminum (Al) alloy, molybdenum (Mo), a Mo alloy, copper (Cu), or a Cu alloy.

The gate wiring 121, 122 and 123 may have a multi-layer structure including two conductive layers (not illustrated) having different physical properties from each other. One of the two conductive layers may include a low-resistivity metal, for example, an Al-series metal, a silver (Ag)-series metal, or a Cu-series metal, so as to reduce signal delays or voltage drops in the gate wiring 121, 122 and 123, and the other conductive layer may include another material, for example, a material with relatively strong contact properties with respect to indium tin oxide (ITO) or indium zinc oxide (IZO), such as a Mo-series metal, Cr, titanium (Ti) or tantalum (Ta). Examples of the combination of the two conductive layers include the combination of a Cr lower layer and an Al upper layer and the combination of an Al lower layer and a Mo upper layer.

The gate wiring 121, 122 and 123 may include a gate line 121, which may be disposed in a display area and may extend in a horizontal direction, the gate electrode 122, which may be connected to the gate line 121, and a common voltage line 123, which may be connected to the common electrode 171 and may supply a common voltage to the common electrode 171.

The gate insulating layer 131 is formed on the gate electrode 122 and the common electrode 171 to insulate the gate electrode 122 and the common electrode 171 from a data electrode 141.

The gate insulating layer 131 may be formed as an inorganic layer including silicon nitride (SiNx) or silicon oxide (SiOx).

The semiconductor layer 132, which may form a channel (e.g., a path of movement of electric charges from the TFT), may be disposed on the gate insulating layer 131, and the resistive contact layer 133, which may be an electrically resistive layer, may be disposed on the semiconductor layer 132. The semiconductor layer 132 and the resistive contact layer 133 may be amorphous semiconductors or crystalline semiconductors.

Data wiring 141, 142 and 143 may be disposed on the resistive contact layer 133 and the gate insulating layer 131. The data wiring 141, 142 and 143 may be a single- or double layer and may include a metal.

The data wiring 141, 142 and 143 may include a data line 141, which may extend in a vertical direction and may intersect the gate line 121 so as to define a pixel, the source electrode 142, which may be branched off from the data line 141 and may extend beyond the top of the resistive contact layer 133, and the drain electrode 143, which may be isolated from the source electrode 142 and may be disposed on the top of the resistive contact layer 133 on the opposite side of the resistive contact layer 133 from the source electrode 142.

The data wiring 141, 142 and 143 may be formed as a single- or double (or more) layer by using a metal such as Cr, a Cr alloy, an Al alloy, Mo, a Mo alloy, Cu, or a Cu alloy.

The protective layer 151, which may be an insulating layer for protecting a channel portion of the TFT, may be disposed on the source electrode 142, the drain electrode 143, the semiconductor layer 132 and the gate insulating layer 131.

The protective layer 151 may be a single layer including SiNx, or a double (or more) layer including an inorganic layer and an organic insulating layer. The pixel electrode 161, which may apply a pixel voltage to the liquid crystal layer 300, may be disposed on the protective layer 151.

The pixel electrode 161 may include a transparent metal such as ITO or IZO. The pixel electrode 161 may be electrically connected to the drain electrode 143 through a contact hole 152, which may be formed in the protective layer 151, and may thus be provided with a data voltage.

The pixel electrode 161 may include a first sub-electrode 161*a* and at least one second sub-electrode 161*b*. The first sub-electrode 161*a* may be parallel to the gate line 121 and may be connected to the drain electrode 143. The second sub-electrode 161*b* may extend from the first sub-electrode 161*a* in parallel to the data line 141. More than one second sub-electrode 161*b* may be provided, and may be disposed at regular intervals.

The common electrode 171 may be disposed on the first transparent substrate 110 together with the gate line 121, and may receive the common voltage from the common voltage line 123. The common electrode 171, unlike the pixel electrode 161, may have the shape of a plate. More than one common electrode 171 may be provided, and may be disposed at regular intervals in a similar manner to the pixel electrode 161.

The pixel electrode 161 may be connected to the drain electrode 143 of the TFT, and the gate insulating layer 131 and the protective layer 151 may be disposed between the pixel electrode 161 and the common electrode 171. Alternatively, only one of the gate insulating layer 131 and the protective layer 151 may be disposed between the pixel electrode 161 and the common electrode 171. The common electrode 171, like the pixel electrode 161, may include a transparent metal such as ITO or IZO. The common electrode 171 may be connected to the common voltage line 123 and may thus receive the common voltage from the common voltage line 123.

The common electrode 171 may form a fringe field together with the pixel electrode 161, and thus may form a vertical or horizontal electric field.

The second display panel 200 may include a black matrix 220, a color filter 230 and the first alignment layer 181. The second display panel 200 may have a structure in which the black matrix 220, red, green and blue color filters 230, and the first alignment layer 181 are sequentially disposed on a second transparent substrate 210. However, exemplary embodiments of the present invention, and particularly, the color filters 230, are not limited to this. For example, the color filters 230 may be disposed on the first display panel 100.

A column spacer 240 may be disposed on the second display panel 200 to maintain the gap between the first display panel 100 and the second display panel 200.

The black matrix 220 may be disposed on the second transparent substrate 210. The black matrix 220 may be a single- or double layer (or more) and may include a metal such as Cr or a polymer resin. The color filters 230, which may be red, green or blue and may provide color to light, may be disposed on the black matrix 220 for each pixel.

The column spacer 240 may be disposed on the color filters 230 where the black matrix 220 is disposed, and may maintain the gap between the first display panel 100 and the second display panel 200. However, exemplary embodiments of the present invention are not limited to this. For example, the column spacer 240 may be disposed on the first display panel 100.

A transparent conductive layer (not illustrated) and an insulating layer (not illustrated), which may cover the transparent conductive layer (not illustrated), may be disposed on an outer surface of the second transparent substrate 210.

The transparent conductive layer may include tin oxide, IZO, or ITO. The transparent conductive layer may include the same material as the common electrode 171. The insulating layer may be transparent. The insulating layer may include SiNx, SiOx, or silicon oxy-fluoride (SiOF).

A multilayer consisting of the insulating layer and the transparent conductive layer may reflect light due to the difference between the refractive index of the insulating layer and the refractive index of the transparent conductive layer. As a result, loss of light transmitted through the liquid crystal layer 300 may occur (e.g., the transmissivity of the liquid crystal layer 300 may decrease). Accordingly, the thicknesses of the transparent conductive layer and the insulating layer may be determined in consideration of the refractive indexes of the insulating layer and the transparent conductive layer so as to minimize a decrease in the transmissivity of the liquid crystal layer 300.

The first alignment layer 181 and the second alignment layer 182 may be formed by a rubbing method or an optical alignment method to determine the alignment of the liquid crystals 30.

When the rubbing method is used, the shape of microgrooves that are formed on the alignment layer may be varied depending on the strength of friction between an alignment cloth and the alignment layer. As a result, the alignment of the liquid crystals 30 may become irregular, and phase distortion and light scattering may occur. The substrate may be damaged due to electrostatic discharge (ESD) that may be caused by rubbing on the surface of a polymer. Due to dust and dirt from a rubbing cloth, the yield of production may decrease.

When using the optical alignment method, the shape of microgrooves that are formed on the alignment layer might not be varied, the alignment of the liquid crystals 30 may be more regular, and the occurrence of phase distortion and light scattering may be reduced or eliminated. In the optical alignment method, photo dimerization, photo isomerization or photo decomposition may be induced by applying linearly-polarized UV light onto the substrate where a photo-sensitive polymer is applied, and as a result, the alignment layer may be allocated a predetermined alignment direction.

The optical alignment method is a non-contact method, and can thus prevent the infiltration of impurities or the occurrence of a variety of problems that may be caused by ESD. Since the optical alignment method is relatively easy to perform and can increase the yield of production, the optical alignment method may be suitable for mass production. Since the optical alignment method can form a multi-domain simply by applying UV light, the optical alignment may be effective for the improvement of viewing angles.

In a non-limiting example, the first alignment layer 181 and the second alignment layer 182 may be optical alignment layers that include a photo-polymerization-type polymer, a photo-isomerization-type polymer, or a photo-decomposition-type polymer.

Examples of a compound aligned by trans-to-cis photo-isomerization include an azo compound such as a sulfonated diazo dye or an azo polymer, or stilbenes, and examples of a compounds aligned by photo-decomposition include cyclobutane-1,2,3,4-tetracarboxylic dianhydride, aromatic polysilane or polyester, polystyrene, or polyimide.

Examples of a compound aligned by photo-cross-linking or photo-polymerization include a cinnamate compound, a coumarin compound, a cinnamamide compound, a tetrahydrophthalimide compound, a maleimide compound, a benzophenone compound, a diphenylacetylene compound, a compound (hereinafter, the chalcon compound) with a chalconyl residue as a photosensitive residue, or a compound (hereinafter, the anthracenyl compound) with an anthracenyl residue.

In a non-limiting example, the photo-polymerization-type polymer may be a cinnamate-based polymer that aligns the liquid crystals 30 through a photo-polymerization reaction, the photo-isomerization-type polymer may be a polymer with an azobenzene group that aligns the liquid crystals 30 through a photo-isomerization reaction, and the photo-decomposition-type polymer may be a cyclobutane-based polyimide polymer that aligns the liquid crystals 30 through a photo-decomposition reaction.

In a non-limiting example, the cyclobutane-based polyimide polymer may be, but is not limited to, a cyclobutane-based polyimide polymer containing a monomer of Formula (2):

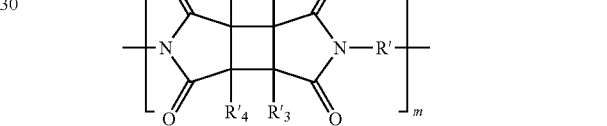

Formula (2)

where each of $R'_1$ to $R'_4$ may be independently H or a linear or branched, saturated or unsaturated alkyl group containing 1 to 20 carbon atoms, R' may be at least one diether compound selected from the group consisting of dimethoxyethane, ethoxy-methoxy ethane, diethoxymethane and diethoxyethane, at least one aromatic compound selected from the group consisting of benzene, benzyl ether, phenylbenzene and diphenylbenzene, or a combination thereof, and m may be a natural number ranging from 1 to 300.

In an LCD panel according to an exemplary embodiment of the present invention, the content of an alkoxy group included in polarized liquid crystals with negative dielectric anisotropy may range from 50% to 60% of the total weight of neutral liquid crystals and the polarized liquid crystals with negative dielectric anisotropy. In this alkoxy group content range, image sticking may be reduced. In response to an alkoxy group being contained in polarized liquid crystals with negative dielectric anisotropy in the range of 50% to 60% of the total weight of neutral liquid crystals and the polarized liquid crystals with negative dielectric anisotropy, image sticking may be reduced without the addition of a HALS. Image sticking may be further reduced by adjusting the content of the alkoxy group in the polarized liquid crystals with negative dielectric anisotropy to be in the range of 50% to 60% of the total weight of neutral liquid crystals and the polarized liquid crystals with negative dielectric anisotropy, and adding a HALS to a resulting liquid crystal composition.

In a non-limiting example, polarized liquid crystals may be at least one selected from the group consisting of the compounds of Formulas (3), (4), and (5):

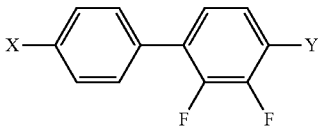
Formula (3)

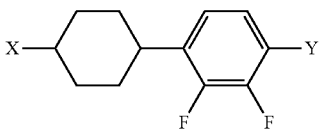
Formula (4)

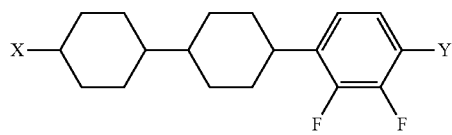
Formula (5)

where X may be an alkyl group with two to five carbon atoms and Y may be an alkyl, alkenyl or alkoxy group with two to five carbon atoms.

The less the content of the compound of formula (3), the more image sticking may be reduced. Accordingly, the polarized liquid crystals may be a mixture of the compound of formula (4) and the compound of formula (5).

In an LCD panel according to an exemplary embodiment of the present invention, polarized liquid crystals with negative dielectric anisotropy may contain neither the compound of formula (6) nor the compound of formula (7):

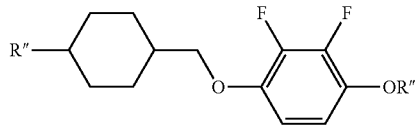
Formula (6)

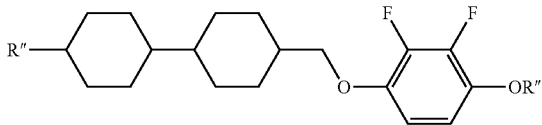
Formula (7)

where R″ may be an alkyl, alkenyl or alkoxy group with two to five carbon atoms.

Dialkoxy benzene compounds represented by formula (6) or (7) may increase image sticking. Accordingly, the polarized liquid crystals with negative dielectric anisotropy might not contain the compound of formula (6) or the compound of formula (7).

Figure 3:
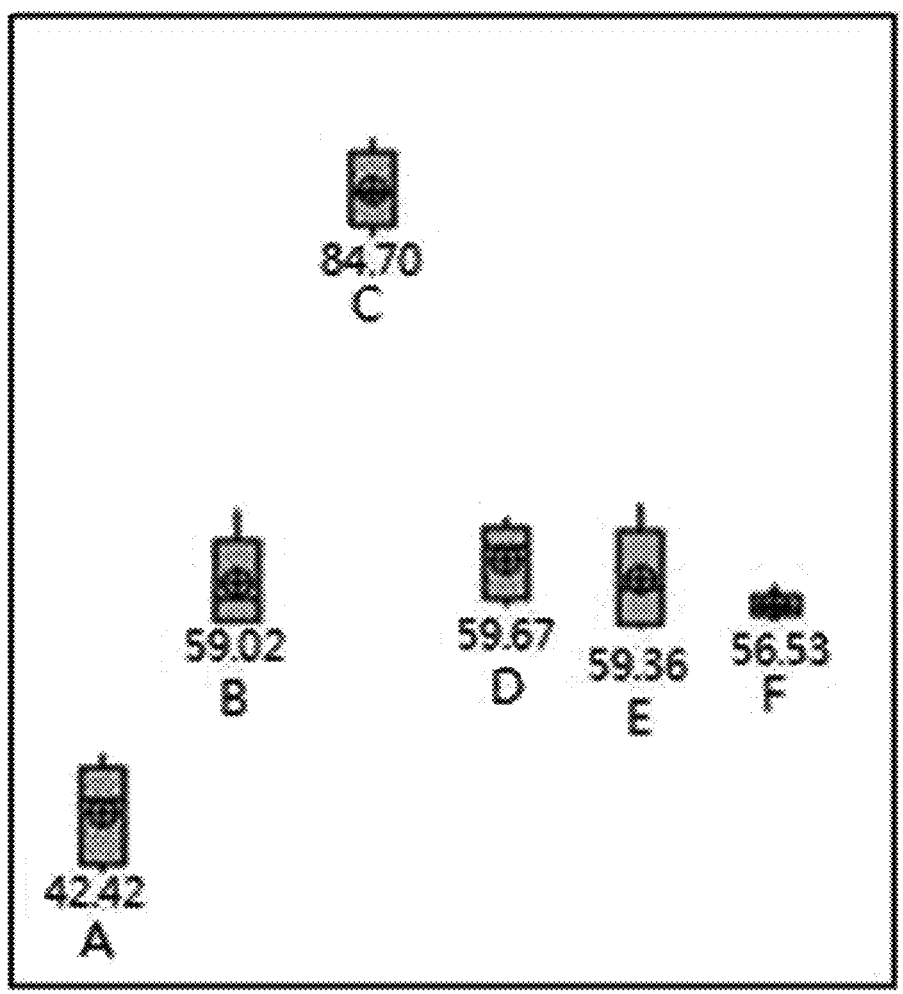
FIG. 3 is a diagram showing voltage holding ratio (VHR) measurements obtained from an LCD panel according to an exemplary embodiment of the present invention and from LCD panels according to comparative examples.

FIG. 3 is a diagram showing voltage holding ratio (VHR) measurements obtained from an LCD panel according to an exemplary embodiment of the present invention.

The LCD panel according to an exemplary embodiment of the present invention and one or more LCD panels according to comparative examples may be fabricated by bonding the first display panel 100 and the second display panel 200 together and injecting liquid crystals with negative dielectric anisotropy between the first display panel 100 and the second display panel 200, and the VHRs of the LCD panel according to an exemplary embodiment of the present invention and the LCD panels according to comparative examples may be measured.

As shown in Table 1 below, a HALS may be added to an LCD panel C according to an exemplary embodiment of the present invention, but no HALS need be added to LCD panels A, B, D, E and F according to comparative examples.

The LCD panel C may be the same as the LCD panel D except that the HALS may be added thereto. The LCD panels A, B, D, E and F may differ from one another in terms of the liquid crystals thereof.

Referring to FIG. 3, reference characters A, B, D, E and F represent LCD panels according to comparative examples, respectively, which include liquid crystals with negative dielectric anisotropy and with no HALS added thereto, and reference character C represents the LCD panel according to an exemplary embodiment of the present invention, which has liquid crystals with negative dielectric anisotropy and with the HALS added thereto.

TABLE 1

| | HALS |
|---|---|
| Exemplary Embodiment C | 800 ppm of HALS added |
| Comparative Example A | No HALS added |
| Comparative Example B | No HALS added |
| Comparative Example D | No HALS added |
| Comparative Example E | No HALS added |
| Comparative Example F | No HALS added |

The LCD panel A may show a VHR of 42.42%, the LCD panel B a VHR of 58.02%, the LCD panel D a VHR of 59.67%, the LCD panel E a VHR of 59.36%, and the LCD panel F a VHR of 56.53%. The LCD panel C may show a VHR of 84.70%.

The VHR measurements shown in FIG. 3 indicate that the LCD panel according to an exemplary embodiment of the present invention (e.g., the LCD panel C having liquid crystals with a HALS added thereto), may have an increased VHR as compared to the LCD panels A, B, E and F.

Figure 4:
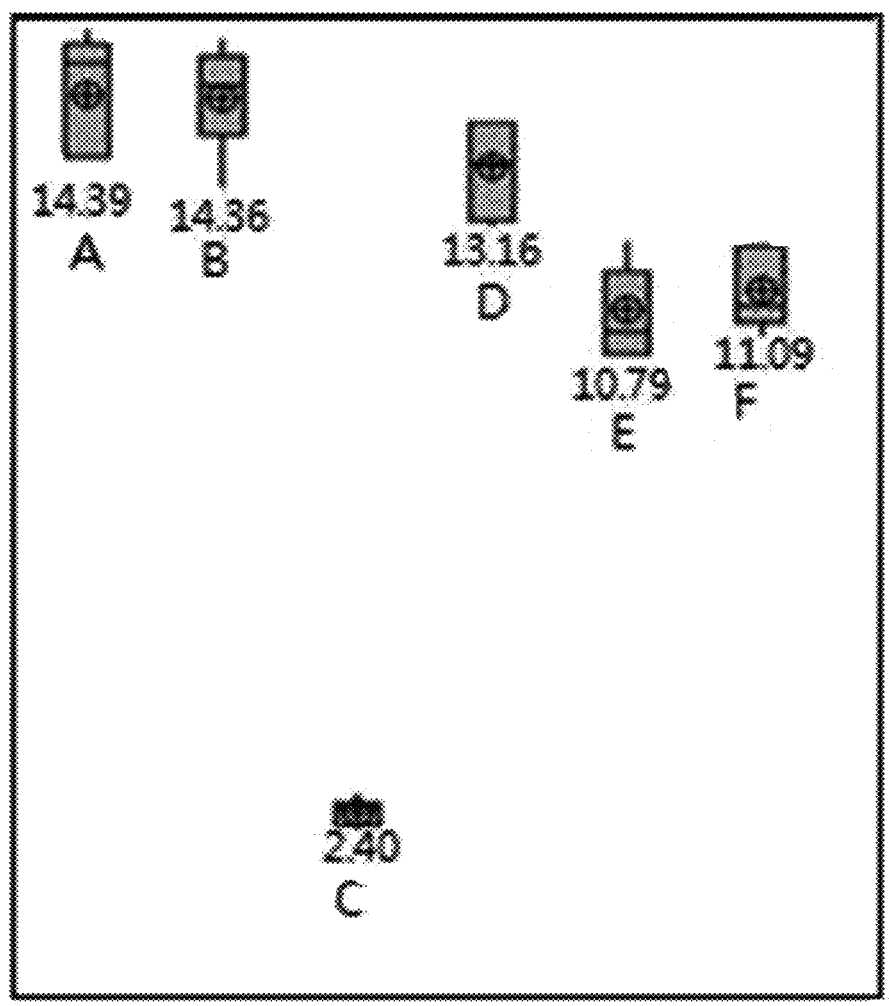
FIG. 4 is a diagram showing ion density measurements obtained from the LCD panel according to an exemplary embodiment of the present invention and from the LCD panels according to comparative examples.

FIG. 4 is a diagram showing ion density measurements that may be obtained from the LCD panel according to an exemplary embodiment of the present invention and from the LCD panels according to comparative examples.

Referring to FIG. 4, the LCD panel A may show an ion density of 14.39 nC, the LCD panel B an ion density of 14.36 nC, the LCD panel D an ion density of 13.16 nC, the LCD panel E an ion density of 10.79 nC, and the LCD panel F an ion density of 11.09 nC. The LCD panel C according to an exemplary embodiment of the present invention may show an ion density of 2.40 nC.

The measurement results shown in FIG. 4 indicate that the LCD panel according to an exemplary embodiment of the present invention (e.g., the LCD panel C) with the HALS added thereto, has reduced ion density as compared to the LCD panels A, B, D, E and F.

Figure 5:
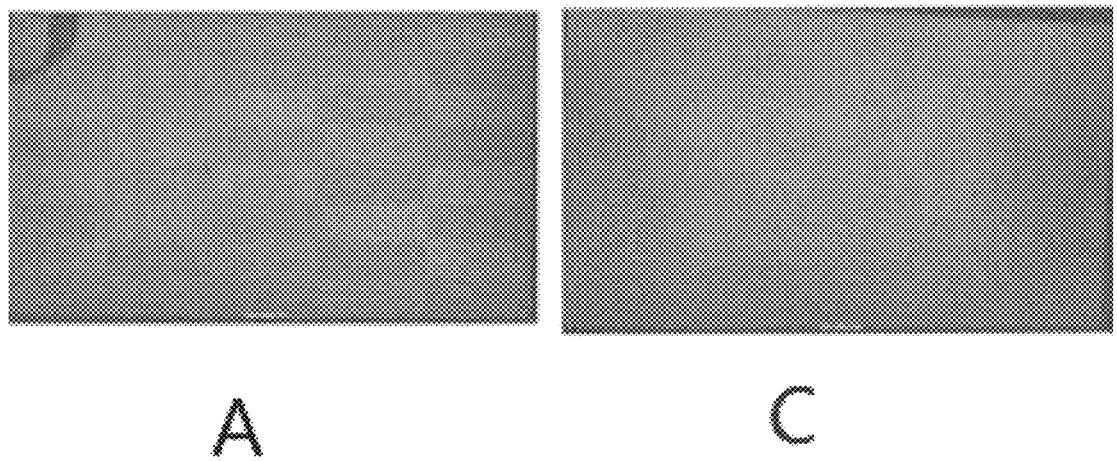
FIG. 5 is a diagram comparing the reduction in image flickering by the LCD panel according to an exemplary embodiment of the present invention and the reduction of image flickering by the LCD panels according to comparative examples.

FIG. 5 is a diagram comparing the reduction in image flickering in the LCD panel according to an exemplary embodiment of the present invention and the reduction in image flickering in the LCD panels according to comparative examples. Referring to FIG. 5, the LCD panel according to an exemplary embodiment of the present invention (e.g., the LCD panel C) shows a reduction in surface image flickering as compared to the LCD panel A.

While the invention has been particularly shown and described with reference to exemplary embodiments thereof, it will be understood by those of ordinary skill in the art that various changes in form and detail may be made therein without departing from the spirit and scope of the present invention.

What is claimed is:

1. An LCD panel, comprising:
   a first substrate;
   a second substrate; and
   a liquid crystal layer disposed between the first substrate and the second substrate,
   wherein the liquid crystal layer includes neutral liquid crystal compound and polarized liquid crystal compounds with negative dielectric anisotropy,
   wherein the polarized liquid crystal compounds with negative dielectric anisotropy include a mixture of compounds of Formulas (4) and (5):

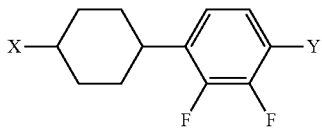
   Formula (4)

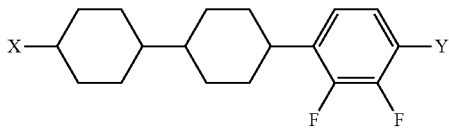
   Formula (5)

where X is an alkyl group with two to five carbon atoms and Y is an alkyl, alkenyl or alkoxy group with two to five carbon atoms;
   wherein both of the polarized liquid crystal compounds with negative dielectric anisotropy satisfying Formulas (4) and (5) include at least one compound containing an alkoxy group in which Y is an alkoxy group,
   wherein at least one of the polarized liquid crystal compounds with negative dielectric anisotropy satisfying Formulas (4) and (5) include at least one compound in which Y is an alkenyl group,
   wherein a weight of the polarized liquid crystal compounds containing the alkoxy group ranges from 50% to 60% of the total weight of the neutral liquid crystal compound and the polarized liquid crystal compounds with negative dielectric anisotropy, and
   wherein the liquid crystal layer further includes a hindered amine light stabilizer (HALS), wherein the HALS includes at least one unit compound of Formula (1):

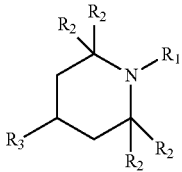
   Formula (1)

wherein $R_1$ is C1-C18 alkyl, cyclohexyl acrylate, methacrylate, or C7-C18 alkyl aryl, $R_2$ is H, C1-C18 alkyl, cyclohexyl acrylate, methacrylate, or a C4-C8 cycloalkyl residue by two $R_2$s bonded to the same carbon atom, and R3 is a hydroxyl group (—OH), a C1-C18 alkoxy group, a C4-C8 cycloalkoxy group, an alkoxy group of an aromatic cyclic compound, or an alkoxy group of a heteroaromatic compound.

2. The LCD panel of claim 1, wherein the polarized liquid crystal compounds with negative dielectric anisotropy do not include dialkoxy benzene compounds of Formulas (6) and (7):

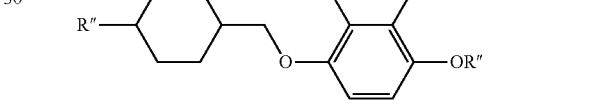
   Formula (6)

   Formula (7)

where R″ is an alkyl, alkenyl or alkoxy group with two to five carbon atoms.

3. The LCD panel of claim 1, wherein $R_2$ is H, C5-C18 alkyl, cyclohexyl acrylate, methacrylate, or a C5-C8 cycloalkyl residue by two $R_2$s bonded to the same carbon atom.

* * * * *